E. E. HOLLANDER.
TOOL FOR MAKING HOLES NON-CIRCULAR.
APPLICATION FILED MAY 3, 1918.
1,328,085.
Patented Jan. 13, 1920.
2 SHEETS—SHEET 1.
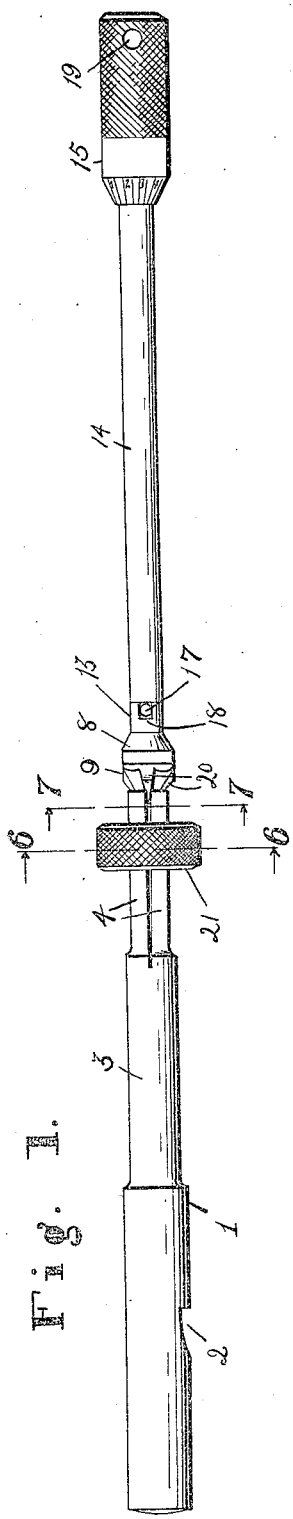
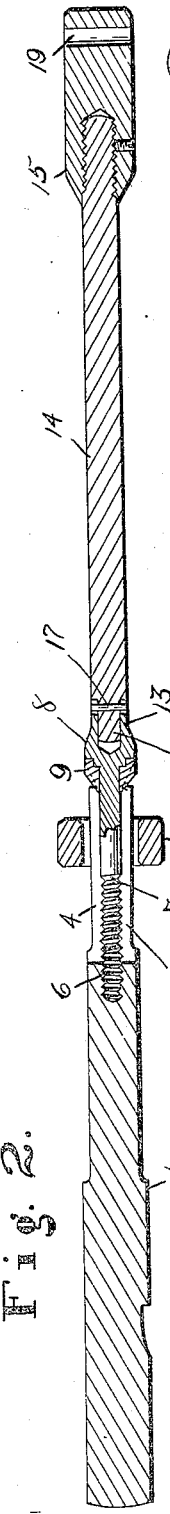
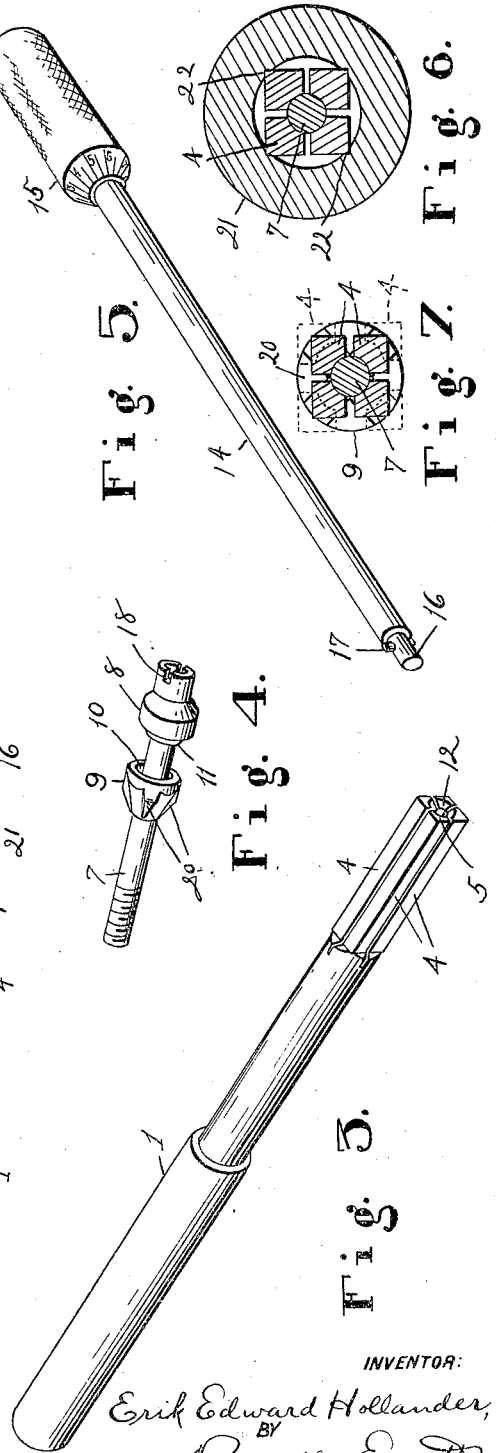
INVENTOR:
Erik Edward Hollander,
BY
Russell M. Everett,
ATTORNEY.

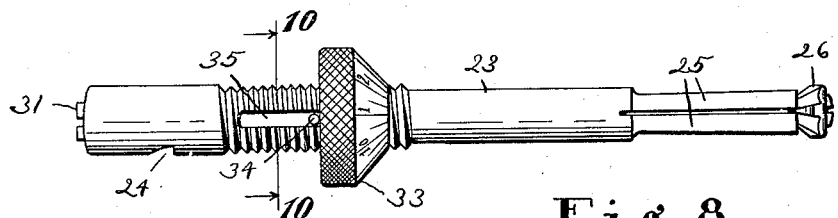
Fig. 8.
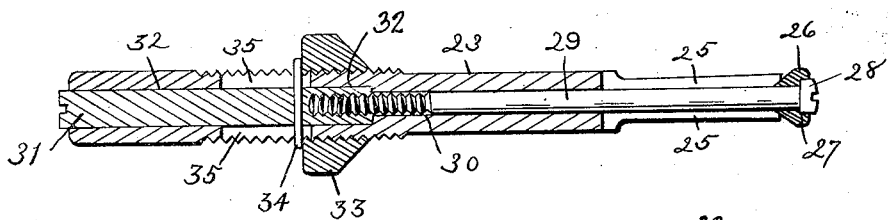
Fig. 9.
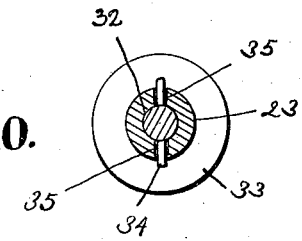
Fig. 10.
Fig. 11.
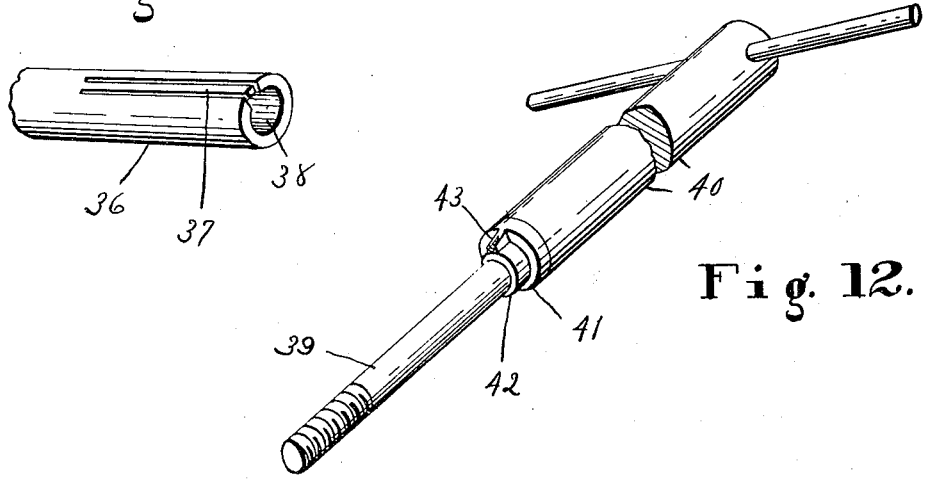
Fig. 12.

UNITED STATES PATENT OFFICE.

ERIK EDWARD HOLLANDER, OF NEWARK, NEW JERSEY.

TOOL FOR MAKING HOLES NON-CIRCULAR.

1,328,085.   Specification of Letters Patent.   Patented Jan. 13, 1920.

Application filed May 3, 1918. Serial No. 232,292.

*To all whom it may concern:*

Be it known that I, ERIK EDWARD HOLLANDER, a subject of the King of Sweden, and a resident of Newark, in the county of Essex and State of New Jersey, have invented new and useful Improvements in Tools for Making Holes Non-Circular, of which the following is a specification.

This invention relates primarily to a tool for making round holes square, although it can equally well be utilized for making them of any angular shape or indeed of any non-circular shape, such as keyhole shape, for example; furthermore, it is not essential that the hole enlarged or reshaped be originally round, as it may be of any shape which will guide the tool. My invention particularly relates to metal working, although it could be utilized for cutting other materials, and I do not restrict it at all in that respect.

The objects of the invention are to secure a simple device by which a non-circular hole can be quickly and easily produced by a machinist; to provide a tool which can be utilized in any shaper, drill-press, slotter or other suitable machine now found in shops; to secure exactness and accuracy of work, and to enable the same to be freely inspected and measured during the progress of the work; to secure a tool whose cut can be set or changed from either side of the work; to prevent deflection or springing of the cutting edges during operation, and particularly to reinforce them during the first stroke or cut; to provide such reinforcing or positioning means which shall not after the first cut interfere with the spreading or adjusting of the cutters; to enable holes to be reshaped or recut in various forms, either regular or irregular, and to obtain other advantages and results as may be brought out in the following description.

Referring to the accompanying drawings, in which like numerals of reference indicate the same parts throughout the several views, Figure 1 is a side view of a complete tool embodying my invention, with its parts in position for operating;

Fig. 2 is a central longitudinal section of the same;

Fig. 3 is a perspective view of the cutter member;

Fig. 4 is a perspective view of the spreader member;

Fig. 5 is a perspective view of a detachable handle for the spreader member;

Fig. 6 is a cross-section on line 6—6, Fig. 1, looking in the direction indicated by the arrows;

Fig. 7 is a cross-section on line 7—7, Fig. 1, looking in the direction indicated by the arrows;

Fig. 8 is a side view of a modified form of the tool shown in Figs. 1-7;

Fig. 9 is a central longitudinal section of the same;

Fig. 10 is a cross-section on line 10—10, Fig. 8 looking in the direction indicated by the arrows;

Fig. 11 is a perspective view of the end of a cutting member specially adapted to cut a slot at the side of a circular hole, and Fig. 12 is a perspective view of a spreader member adapted to be employed therewith.

The specific embodiments of the invention shown in Figs. 1-10 are tools for making a round hole, which has been drilled in a plate, block or other piece of metal, square, and in Figs. 1-7 I have shown a form of the tool in which the spreader member is operated at the side of the work away from the tool holder, while in Figs. 8-10 I show a form of the tool in which the spreader member is operated at the same side of the work as the tool holder.

Referring first to Figs. 1-7, 1 indicates the cutter member which is adapted at one end, as at 2, to be clamped in any ordinary and well-known tool holder, such as that of a shaper, slotter, drill-press or the like, by which it can be reciprocated longitudinally. The cutter member has an intermediate shank 3 and at its other end is squared and split upon planes at right angles to each other and parallel one to each pair of opposite sides of the squared end, into cutter arms 4. These cutter arms are adapted to be spread, by means hereinafter described, and to cut at their right angular extremities or end edges.

The cutting end of the cutter member is not only split or divided into cutter arms, as described, but it is also bored centrally and longitudinally, as at 5, preferably a greater distance than the length of the cutter arms, and the inner end portion of the hole thus formed is tapped or threaded, as at 6. This threaded hole receives the end of the shank 7 of the spreader member, said member having a head 8 outside the end of the cutter arms 4 which head is adapted to slidably fit the hole to be reshaped or squared and to force between the cutter arms spreading means for springing them outwardly apart to take a cut. Such spreading means is preferably a collar 9 loose with respect to the shank 7 and head 8, so as to reduce friction but of substantially the same diameter and having at its larger end a recess 10 to receive a centering projection 11 on the head. This collar is tapered at its end adapted to be forced in between the cutter arms 4, and preferably the hole between said arms is flared as at 12 to receive the tapered collar.

It will thus be seen that as the spreader member is forced into the cutter member, the cutting arms will be spread to engage the walls of the hole to be reshaped or squared, and obviously such forcing may be done by any suitable means for turning the spreader member with respect to the cutter member. In Figs. 1–7 I have shown the spreader member with a short shank 13 beyond its head 8, which detachably receives the long shank 14 of a turning handle 15, such detachability enabling the turning handle to be removed for convenience in inspecting or measuring the hole being formed and from which said turning handle projects. The shank of the turning handle is shown with a reduced extremity 16 adapted to enter a central socket in the head or its shank 13 and a cross-pin 17 through said reduced extremity adapted to lie at its ends in slots 18 in the walls of said socket, but any other suitable connection could be employed. The turning handle 15 is shown as knurled and also transversely drilled as at 19 to receive a cross-bar (not shown) if necessary. Preferably the inner end of the handle 15 is beveled and provided with graduations, so that the spreader member can be turned with greater regularity to spread the cutter arms.

To prevent lateral deflection of the ends of the cutter arms toward or away from each other in cutting, such as would tend to make an irregular hole, I prefer to form on the spreading collar 9 ribs 20 which enter between the cutting arms and hold them against any such deflection. Furthermore, it is of assistance in making the first cut true and regular to have upon the outside of the cutter arms a ring 21 which has interior positioning notches 22, to receive the corners of the cuting arms. This can be slid up on the cutter arms, after they have been set for the first cut by the spreader member, and will materially assist in holding them against any deflection or movement from their true and accurate position. This ring can be slid up where it will hold quite tightly, and then upon the first cut, unless the work be very thin indeed, it will strike the face of the work and be automatically released or slid back, so that the cutter arms can be freely spread for the next cut. It is usually unnecessary to use this outside ring except for the first cut, although of course it could be used afterward if desired.

Under conditions where it is impossible or inconvenient to have the turning means for the spreader member project at the opposite side of the work from the tool holder, I may provide turning means at the same side of the work as the tool holder, and in Figs. 8–10 inclusive I have illustrated such a construction. Here 23 indicates a cutter member adapted as at 24 to be clamped in a tool holder and having at its end cutter arms 25; between the ends of said cutter arms a spreader 26 similar to the one already described is adapted to be forced, but the recess 27 in the base of said spreader receives the head 28 of a rod or bolt 29 which extends loosely through the spreading collar and a passage 30 bored longitudinally through the cutter member, the inner end of said bolt or rod being threaded and adapted to screw into an elongated nut 31 in an enlarged portion 32 of the bored passage 30, said enlargement extending through the tool holder end of the cutter member and the nut 31 being accessible thereat. Both the nut 31 and the head 28 of the bolt or rod 29 are slotted, or provided with other suitable means for turning them with respect to each other, but this turning is only for bringing them into operative position or relation to each other, preferably.

For spreading the cutter arms 25 I prefer to slide the nut 31, bolt 29 and spreading collar 26 as a unit, by means located on the outside of the cutter member between the tool holder and work, and I have illustrated such means as a traveling collar 33 threaded on the outside of the cutter member and adapted to push against the ends of a pin 34 projecting from the nut 31 through longitudinal slots 35 in the wall of the cutter member. This traveling collar 33 preferably has one end wall graduated as shown, so that the amount of turning can be better estimated, and obviously by means of it the spreader 26 can be drawn in between the cutter arms 25 to spread them. Obviously, a positioning ring, similar to the one 21, described in connection with Figs. 1–7 could be employed in this construction of Figs. 8–10, if desired.

While I have shown my invention embodied in tools for making round holes square it is obvious that holes of any cross-section could be reshaped by making the spreader member of a cross-section adapted to slidably fit the same, and furthermore it is evident that holes can be cut to other shape than square, either regular or irregular.

As an illustration of the latter, I have shown in Figs. 11 and 12 a tool for cutting a single slot in the wall of a round hole, so as to get a sort of keyhole cross-section, and there the construction is very similar to that of Figs. 1–7 except that the end of the cutter member is round and only a single cutter arm provided, which is adapted to be spread by a spreader with the single inclined surface. In said figures, 36 indicates the cutting end of the cutter member, which is round in this particular instance, although it might be of any shape to fit a hole in whose wall it was desired to cut a slot, and 37 indicates a single resilient cutter arm. The end of the cutter member is bored longitudinally, as at 38, to receive the shank 39 of the spreader member 40, which carries a spreader 41 having a sleeve-like portion 42 to enter the end of the cutter member without spreading the same and a flaring fin 43 to spread the cutter arm 37. This spreader 41 is of course loose on the spreader member, and thus as said member is screwed into the cutter member the single cutting arm is spread more and more to take a deeper and deeper cut as the tool reciprocates.

Preferably, the cutter arm 37, in the construction last described, is cut out by saw slits, as shown, and thus it is desirable to have the inclined surface of the fin 43 grooved, as shown, to center the cutter arm against lateral deflection, that is to say, the sharp lateral edges of the grooved fin wedge into the saw slits and prevent lateral deflection of the cutter arm. It will also be noted that the spreading collar 26 of the construction shown in Figs. 8–10 is rounded at its outer end, so as to not dig into the walls of the hole in which it slides, and this same feature could be embodied in the constructions of Figs. 1–7, though there is not the same reason for it there. The ribs 20 of the spreading collar of Figs. 1–7 of course taper in face view, as shown, so as to fill the constantly widening space between the cutter arms as they are spread, and preferably said ribs are of uniform thickness in a plane at right angles to the axial line of the spreader member, so as to secure a stable bearing against the cutter arms.

Obviously in cutting holes of a regular cross-sectional shape, the spreader could be conical and indeed could be fast on the turning member of the tool so as to rotate therewith as it is forced in between the cutter arms, if for any reason this was desired, but it will be understood that this creates a tendency to deflect the cutter arms with respect to each other and therefore is not usually advisable. Various other modifications of construction can be made in the manufacture of my invention without departing from the spirit and scope of the same, and therefore I do not wish to be understood as restricting myself except as required by the following claims when construed in the light of the prior art.

Having thus described the invention, what I claim is:

1. In a tool of the character described, the combination of a cutter member adapted to reciprocate longitudinally and having a hollow end with a cutting arm in its wall whose extremity can spread radially outward, spreading means in said hollow end, and means at the outside of the cutter member for holding said cutting arm against lateral movement.

2. In a tool of the character described, the combination of a cutter member adapted to reciprocate longitudinally and having a hollow end with a cutting arm in its wall whose extremity can spread radially outward, spreading means in said hollow end, and a notched ring on the outside of the cutter member for holding said cutting arm against lateral movement.

3. In a tool of the character described, a cutter member adapted to reciprocate longitudinally and having a hollow end with a cutting arm in its wall whose extremity can spread radially outward, and a spreader with a shank adapted to screw into said hollow end and a removable handle for turning adapted while operated to remain and be accessible and to be removed for measuring the work.

4. In a tool of the character described, the combination with a cutter member adapted to be reciprocated and having a cutter arm adapted to be projected radially, of means for spreading said cutter arm intermittently between the reciprocatory strokes of the cutter member, said spreading means adapted to slide in the hole being cut as a guide and having a removable handle adapted while operated to remain and be accessible and to be removed for measuring the work.

5. In a tool of the character described, the combination of a cutter member adapted to reciprocate longitudinally and having a hollow end split into cutting arms, a tapered spreader having ribs to enter between said arms, and means for forcing said spreader into the cutter member.

6. In a tool of the character described, the combination of a cutter member adapted to reciprocate longitudinally and having a hollow end split into cutting arms, a tapered spreader having ribs to enter between said arms, a head adapted to bear against said spreader, a shank to screw into the cutter member, and means for turning said head and shank.

7. In a tool of the character described, the combination of a cutter member adapted to reciprocate longitudinally and having a hollow end split into cutting arms, a tapered spreader having ribs to enter between said arms, means for forcing said spreader into the cutter member, and means at the outside of said arms for holding them against said spreader.

8. In a tool of the character described, the combination of a cutter member adapted to reciprocate longitudinally and having a hollow end split into cutting arms, a tapered spreader having ribs to enter between said arms, means for forcing said spreader into the cutter member, and a ring at the outside of said arms adapted to hold them against the spreader in fixed relation to each other.

9. In a tool of the character described, the combination of a cutter member adapted at one end to be held in a reciprocating holder and having its other end hollow with a cutting arm in its wall whose extremity can be spread radially outward, a spreader in said hollow end, and means intermediate the ends of the cutter member for operating said spreader.

10. In a tool of the character described, the combination of a cutter member adapted at one end to be held in a reciprocating holder and having its other end hollow with a cutting arm in its wall whose extremity can be spread radially outward, a spreader in said hollow end having a stem, means projecting from said stem through a longitudinal slot in the cutter member intermediate its ends, and a collar threaded on the outside of the cutter member to engage said means.

11. In a tool of the character described, the combination of a cutter member adapted to reciprocate longitudinally and having a hollow end split into cutting arms, a tapered spreader having longitudinally tapered ribs to enter between said arms, and means for forcing said spreader into the cutter member.

ERIK EDWARD HOLLANDER.